United States Patent
Leiter

(12) 
(10) Patent No.: US 6,228,485 B1
(45) Date of Patent: May 8, 2001

(54) VENTING TAPE

(75) Inventor: Fredric J. Leiter, Wyoming, MI (US)

(73) Assignee: FlexiPak Distributin, LLC, Grand Rapids, MI (US)

( * ) Notice: Subject to any disclaimer, the term of this patent is extended or adjusted under 35 U.S.C. 154(b) by 0 days.

(21) Appl. No.: 09/321,404

(22) Filed: May 27, 1999

Related U.S. Application Data

(63) Continuation-in-part of application No. 09/302,979, filed on Apr. 30, 1999.

(51) Int. Cl.$^7$ ................................. B32B 7/12; C09J 7/02
(52) U.S. Cl. ................. 428/343; 428/40.1; 428/41.7; 428/195; 428/202; 427/207.1; 427/208.2
(58) Field of Search ................. 428/343, 40.1, 428/41.7, 195, 202; 427/208.2, 207.1

(56) References Cited

U.S. PATENT DOCUMENTS

| | | | |
|---|---|---|---|
| 2,861,006 | * 11/1958 | Salditt | 428/343 X |
| 3,085,572 | * 4/1963 | Blackford | 428/343 X |
| 3,143,208 | * 8/1964 | Sizemore, Jr. | 428/343 X |
| 4,163,822 | * 8/1979 | Walter | 428/343 X |
| 4,955,675 | 9/1990 | Donaghy . | |
| 5,428,209 | 6/1995 | Babu et al. . | |
| 5,492,705 | 2/1996 | Porchia et al. . | |
| 5,560,695 | 10/1996 | Pufpaff . | |
| 5,665,446 | 9/1997 | Sundet . | |
| 5,749,994 | 5/1998 | Sundet . | |

OTHER PUBLICATIONS

U.S. application No. 09/302,979, Fredric J. Leiter, filed Apr. 30, 1999.

* cited by examiner

*Primary Examiner*—Daniel Zirker
(74) *Attorney, Agent, or Firm*—Price, Heneveld, Cooper, DeWitt & Litton

(57) ABSTRACT

A venting tape for use in venting an enclosed article space to be filled with an injected expandable foam material. The venting tape includes a polymeric film having a plurality of minute perforations formed therethrough. The perforations are sized to allow the passage of a gas therethrough yet prevent the passage of expandable foam insulation. The venting tape further includes an adhesive layer on one side of the film in a pattern enabling a substantial portion of the minute perforations to remain uncovered by the adhesive layer.

38 Claims, 1 Drawing Sheet

VENTING TAPE

CROSS-REFERENCES TO RELATED APPLICATIONS

The present application is a continuation in part of a commonly assigned, co-pending U.S. patent application Ser. No. 09/302,979, filed Apr. 30, 1999, entitled VENTING TAPE, which is hereby incorporated herein by reference.

BACKGROUND OF THE INVENTION

The present invention relates to venting tape, and in particular to venting tape used to vent an enclosed article space to be filled with an expandable foam material.

Injected expandable foam materials are used to insulate numerous articles in a wide variety of applications, such as refrigerators, freezers, and the like. The expandable foam material is typically injected into the walls of the appliances between an outer housing and an inner casing, thereby providing a uniform thermal barrier therebetween.

The outer housing of these appliances are typically provided with holes and apertures for venting purposes during the injection of the foam material. These "vent holes" allow the manufacturer to provide an air-tight seal between the outer housing and the inner casing, while allowing air/gas to escape as the expandable foam fills the void therebetween. These holes must be temporary covered during the foam injection process to prevent the foam from escaping from between the inner casing and the outer housing. Heretofore, manufacturers have used foam pads to plug the holes. The pads are designed to allow gas to escape as the foam expands yet restricting the flow of foam through the holes. These pads must be specially cut and formed for each application thereby significantly adding to the cost of manufacture. Further, these pads are often difficult to install during the manufacturing process. In addition, the foam pads typically are supplied in the form of a large coil that is cumbersome to handle and control. Porous tapes have also been used to plug the holes. Several problems have been associated with these tapes including inadequate strength resulting in foam leakage, as well as inadequate air/gas flow resulting in non-uniform fill of the injected foam within the appliance. In addition, porous tapes often tear when the expandable foam actually contacts the tape, thereby allowing the foam to escape from within the appliance. Improper venting is often caused by the adhesives associated with the tapes plugging the holes therein and disrupting the air flow therethrough.

SUMMARY OF THE INVENTION

One aspect of the present invention is to provide a venting tape for use in venting an article space to be filled with an injected expandable foam material, wherein the venting tape includes a polymeric film having a plurality of minute perforations formed therethrough. The perforations are sized to allow the passage of a gas therethrough yet prevent passage of expandable foam insulation. The venting tape further includes an adhesive layer on one side of the film in a pattern enabling a substantial portion of the minute perforations to remain uncovered by the adhesive layer.

Another aspect of the present invention is to provide a method for plugging the escape holes of an article space to be filled with an expandable foam material, the method including providing a polymeric film, and forming a plurality of perforations therethrough, wherein the perforations are sized to allow the passage of a gas therethrough yet prevent passage of expandable foam insulation. The method further includes applying an adhesive layer to one side of the film in a pattern, and adhering the film over the escape holes of the article.

The principle objects of the present invention are to provide a relatively simple, cost effective way to adequately cover the vent holes of an appliance by allowing the gas/air to escape while retaining the expandable foam insulation with the appliance. The present inventive venting tape is easier to apply than the foam pads currently in use. Further, the present inventive venting tape has a relatively increased strength that allows the tape to resist tearing and withstand the increased pressure created when the expandable foam contacts the tape. In addition, by applying the adhesive to the film in a pattern, the adhesive does not plug all the perforations, thereby allowing expandable foam to effectively fill the void between the outer housing and inner casing.

These and other advantages and objects of the present invention will be further understood and appreciated by those skilled in the art by reference to the following specification, claims, and appended drawings.

DETAILED DESCRIPTION OF PREFERRED EMBODIMENT

Figure 1:
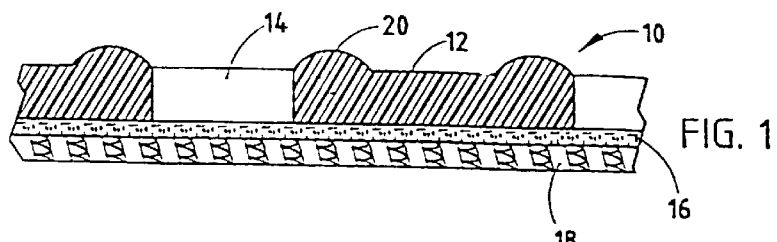
FIG. 1 is an enlarged, fragmentary, cross sectional side view of a vent tape embodying the present invention.
Figure 4:
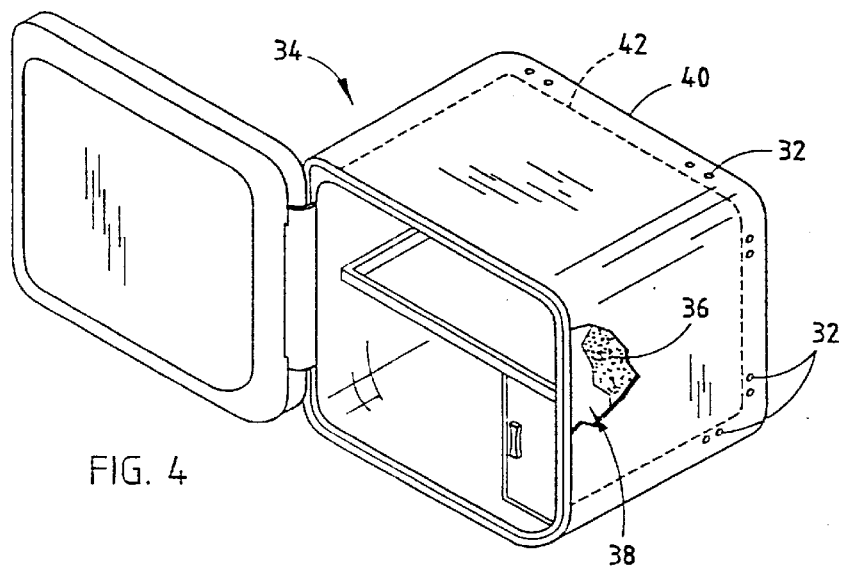
FIG. 4 is a perspective view of a refrigerator.

The reference numeral 10 (FIG. 1) generally designates a venting tape for use in venting an enclosed article space or void 38 (FIG. 4) to be filled with an injected expandable foam material 36. Venting tape 10 includes a polymeric film 12 having a plurality of minute perforations 14 formed therethrough. Perforations 14 are sized to allow the passage of a gas or air therethrough yet prevent passage of expandable foam insulation 32 (FIG. 4). Venting tape 10 further includes an adhesive layer 16 on one side of film 12 that can be applied in a pattern enabling a substantial portion of the perforations 14 to remain uncovered by adhesive layer 16. Alternatively, adhesive layer 16 can be applied to film 12 substantially covering an entire side thereof, and then blown or vacuumed from within perforations 14, as discussed below.

Venting tape 10 is used in conjunction with the manufacture of appliances 34 (FIG. 4) such as refrigerators or freezers. Appliance 34 includes a void 38 defined between an outer housing 40 and an inner casing 42. Outer housing 40 is provided with a plurality of venting holes 32. Venting tape 10 is used to effectively filter air and gas that is forced from within void 38 and through venting holes 32, while preventing expandable foam 32 from escaping. It should be noted, however, that venting tape 10 can be used to effectively filter holes/apertures within other products such as home door panels, free standing office partition systems, and vehicle components, as well as numerous other applications that use injected expandable foams.

Polymeric film 12 (FIG. 1) is constructed of a polymeric material such as polyester or polypropylene depending upon the temperatures that will be encountered by the venting tape 10 in a particular application. Polymeric film 12 is approximately 10 microns in thickness, however, other thicknesses can be used. Perforations 14 are provided within polymeric film 12 at a density of between about 5 and 2000 perforations per square inch. Preferably, about 330 perforations per square inch are provided. Each perforation 14 is between about 0.6–0.7 microns in diameter, however, other diameters can be substituted. The number of perforations 14 per square inch can be altered depending upon the expandable foam insulation to be used in a particular application. By altering the number of perforations 14, the back pressure created by the air/gas as the foam expands is controlled to maximize filtering efficiencies and allow adequate filling of the void 38 (FIG. 4).

Polymeric film 12 is further provided with raised rings 20 formed about the perforations 14. Rings 20 increase the effective thickness of polymeric film 12 about each and every perforation 14, thereby increasing the effective tear strength of the polymeric film 12 in those regions. The increased tear strength allows venting tape 10 to withstand higher pressures created by the expandable foam 36 contacting venting tape 10 before tearing or failing. Perforations 14 and the associated rings 20 are created by a flame perforation process.

Figures 2A, 2B, 3:
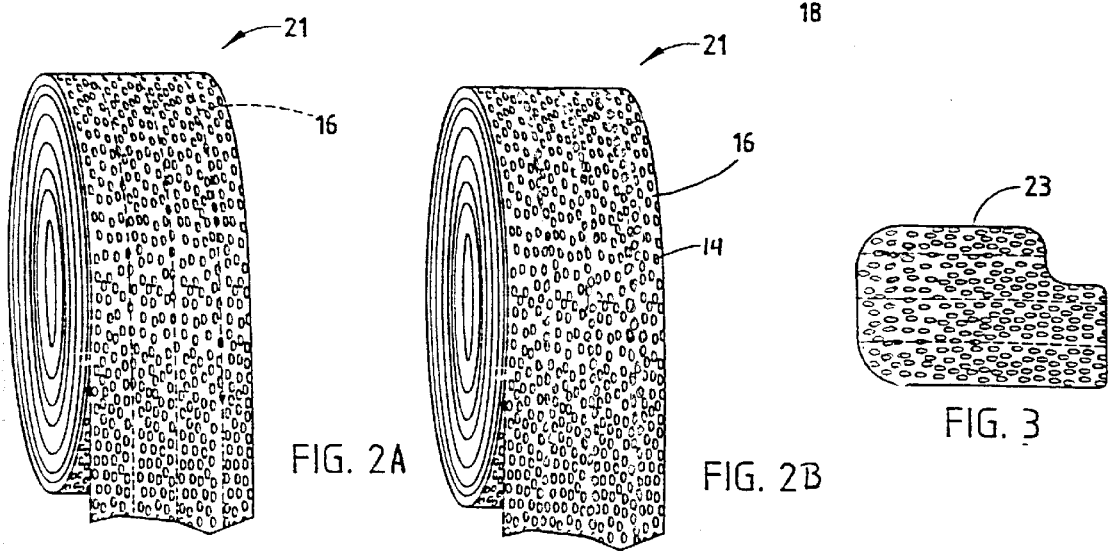
FIG. 2A is a perspective view of a roll of the vent tape with an adhesive layer applied in a linear pattern.
FIG. 2B is a perspective view of a roll of the vent tape with an adhesive layer applied across an entire surface of the vent tape.
FIG. 3 is a top view of a pre-cut section of the vent tape.

In a first embodiment, adhesive layer 16 (FIGS. 1 and 2A) is applied to one side of polymeric film 12 and in a pattern enabling a substantial portion of perforations 14 to remain uncovered by adhesive layer 16. More specifically, adhesive layer 16 is applied to polymeric film 12 in a spaced apart linear pattern along the length of polymeric film 12. Adhesive layer 16 is constructed of a material that allows venting tape 10 to be permanently affixed to an interior surface of an appliance housing 40 (FIG. 4). Adhesive layer 16 is preferably applied in the form of a hot-melt adhesive.

In a second embodiment, adhesive layer 16 (FIGS. 1 and 2B) is applied across an entire side of polymeric film 12. Film 12 is then subjected to a pneumatic pressure that removes or "blows" the adhesive layer 16 from within perforations 14. Alternatively, film 12 can be subjected to a vacuum pressure that removes the adhesive layer 16 from within perforations 14. The pressure, whether pneumatic or vacuum, is exerted on film 12, after adhesive layer 16 is applied thereto, but before adhesive layer 16 has set to a solid or final state. The pneumatic and/or vacuum pressure allows application of the adhesive across the entire surface of polymeric film 12, while preserving the filtering effects thereof.

Venting tape 10 may be further provided with a detachable release liner 18, thus ensuring that adhesive layer 16 does not prematurely adhere to an unintended surface before being applied to the desired application. Release liner 18 is preferably constructed of a silicon coated paper, however, any suitable material may be used. Alternatively, venting tape 10 may be stored such that a releasable liner 18 is not required, as described below.

Venting tape 10 can be provided in the form of a continuous roll 21 (FIG. 2), whereby a length of venting tape 10 may be removed from the roll 22 for a given application. Roll 22 would be preferably sized for easy handling and manipulation during the application process. Venting tape 10, stored as roll 22, can be provided release liner 18. Alternatively, venting tape 10 can be stored as roll 22 without release liner 18, wherein adhesive layer 16 is removably adhered to the non-adhesively coated side of polymeric film 12.

Venting tape 10 can also be pre-cut into a plug 23 (FIG. 3) having a particular geometrical shape and size corresponding with a particular application. Pre-cut plugs 23 can also be provided release liner 18, or can be stored in a "stacked" orientation without release liner 18.

In application and operation, a length of venting tape 10 is removed from roll 21 corresponding to the requirements of a particular application. Release liner 18 is removed from polymeric film 12 to expose adhesive layer 16, if release liner 18 is provided. Polymeric film 12 is then applied over vent holes 32 within the interior of housing 40 of appliance 34. Inner casing 42 is then inserted into housing 40 of appliance 34. The expandable foam insulation 36 is then inserted between inner casing 42 and housing 40 thereby filling void 38 located therebetween. Venting tape 10 allows any gases associated with the expandable foam insulation 36 to exit vent holes 32 through perforations 14, while retaining the expandable foam insulation 36 within void 38, thereby allowing adequate and even filling of void 38.

Venting tape 10 effectively reduces the costs associated with insulating appliances with an expandable foam insulation, by allowing air/gas to pass through vent holes 32 while preventing the passage of the expandable foam 36 as the expandable foam 36 expands to fill void 38 between inner casing 42 and outer housing 40. Venting tape 10 can be cut on site to fit the specific dimensional requirements of a particular application. In addition, venting tape 10 can be easily installed within the outer housing 40 prior to assembly of outer housing 40 with inner casing 42, thereby increasing manufacturing efficiency.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A venting tape for use in venting an enclosed article space to be filled with an injected expandable foam material, the venting tape, comprising:
    an elongated polymeric film having a plurality of minute perforations formed therethrough, the perforations sized to allow the passage of a gas therethrough yet prevent passage of expandable foam insulation, the film also having raised rings formed about the perforations, whereby the tear strength of the film around the perforations is increased; and
    an adhesive layer that covers one side of the film wherein the adhesive has been removed from within a substantial portion of the minute perforations.

2. The venting tape described in claim 1, wherein the adhesive located within and over the perforations is removed by pneumatic pressure.

3. The venting tape described in claim 2, wherein the adhesive located within and over the perforations is removed by applying vacuum pressure.

4. The venting tape described in claim 2, wherein the perforations are formed within the film by flame perforation.

5. The venting tape described in claim 4, further including:
    a release liner detachably adhered to the adhesive layer.

6. The venting tape described in claim 5, wherein the film has a thickness of approximately 10 microns.

7. The venting tape described in claim 6, wherein each perforation is between about 0.6–0.7 microns in diameter.

8. The venting tape described in claim 7, wherein the film has between about 30 and 350 perforations per square inch.

9. The venting tape described in claim 8, wherein the film has about 330 perforations per square inch.

10. The venting tape described in claim 8, wherein the film is provided in a continuous roll, whereby a length of the film may be removed from the roll for a given application.

11. The venting tape described in claim 8, wherein the film is provided in particular geometrical shapes and sizes corresponding with a particular application.

12. The venting tape described in claim 8, wherein the film is of polyester.

13. The venting tape described in claim 8, wherein the film is of polypropylene.

14. The venting tape described in claim 1, wherein the adhesive is in a spaced linear pattern.

15. The venting tape described in claim 1, wherein the film has between about 5 and about 2000 perforations per square inch.

16. The venting tape described in claim 1, further including:
a release liner detachably adhered to the adhesive layer.

17. The venting tape described in claim 1, wherein the perforations are formed within the film by flame perforation.

18. The venting tape described in claim 1, wherein the film has a thickness of approximately 10 microns.

19. The venting tape described in claim 1, wherein each perforation is between about 0.6–0.7 microns in diameter.

20. The venting tape described in claim 1, wherein the film has between about 30 and 350 perforations per square inch.

21. The venting tape described in claim 1, wherein the film has about 330 perforations per square inch.

22. The venting tape described in claim 1, wherein the film is provided in a continuous roll, whereby a length of the film may be removed from the roll for a given application.

23. The venting tape described in claim 1, wherein the film is provided in particular geometrical shapes and sizes corresponding with a particular application.

24. The venting tape described in claim 1, wherein the film is of polyester.

25. The venting tape described in claim 1, wherein the film is of polypropylene.

26. A method for plugging escape holes associated with an article space to be filled with an expandable foam material, comprising:
providing a polymeric film;
forming a plurality of perforations through the film and raised rings about the perforations, the perforations sized to allow the passage of a gas therethrough yet prevent passage of expandable foam insulation, and whereby the rings increase the tear strength of the film around the perforations;
applying an adhesive layer to one side of the film, the adhesive covering a substantial number of the perforations;
removing the adhesive from within and over a substantial number of the perforations covered by the adhesive; and
adhering the film over the escape holes of the article.

27. The method described in claim 26, wherein the step of applying the adhesive layer includes applying the adhesive in a pattern enabling a substantial portion of the perforations to remain uncovered by the adhesive layer.

28. The method described in claim 27, wherein the step of applying the adhesive layer includes applying the adhesive in a spaced linear pattern.

29. The method described in claim 28, wherein the step of applying the adhesive layer includes applying the adhesive in a spaced linear pattern along the length of the film.

30. The method described in claim 26, wherein the step of forming the perforations includes providing perforations at between about 5 and about 2000 per square inch.

31. The method described in claim 26, wherein the step of applying the adhesive layer includes removing the adhesive from within and over the perforations by pneumatic pressure.

32. The method described in claim 26, wherein the step of applying the adhesive layer includes removing the adhesive from within and over the perforations by vacuum pressure.

33. The method described in claim 26, further including:
detachably adhering a release liner to the adhesive layer; and
removing the release liner prior to adhering the film over the escape holes.

34. The method described in claim 26, wherein the step of providing the film includes providing the film is in a continuous roll, whereby a length of the film is removed from the roll prior to adhering the film over the escape holes.

35. The method described in claim 26, wherein the step of providing the film includes providing the film in particular geometrical shapes and sizes corresponding with a particular application.

36. The method described in claim 26, wherein the step of forming the perforations includes forming the perforations within the film by way of a flame perforation process.

37. The method described in claim 26, wherein the step of providing the film includes constructing the film of polyester.

38. The method described in claim 26, wherein the step of providing the film includes constructing the film of polypropylene.

* * * * *